United States Patent
McKenney

(10) Patent No.: US 10,162,644 B2
(45) Date of Patent: *Dec. 25, 2018

(54) SHIELDING REAL-TIME WORKLOADS FROM OS JITTER DUE TO EXPEDITED GRACE PERIODS

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 84 days.

This patent is subject to a terminal disclaimer.

(21) Appl. No.: 15/424,862

(22) Filed: Feb. 5, 2017

(65) Prior Publication Data

US 2018/0046521 A1 Feb. 15, 2018

Related U.S. Application Data

(63) Continuation of application No. 15/234,265, filed on Aug. 11, 2016.

(51) Int. Cl.
| | |
|---|---|
| *G06F 9/4401* | (2018.01) |
| *G06F 3/06* | (2006.01) |
| *G06F 9/48* | (2006.01) |
| *G06F 9/50* | (2006.01) |
| *G06F 9/52* | (2006.01) |
| *G06F 15/177* | (2006.01) |

(52) U.S. Cl.
CPC .......... *G06F 9/4401* (2013.01); *G06F 3/0619* (2013.01); *G06F 3/0653* (2013.01); *G06F 3/0685* (2013.01); *G06F 9/4881* (2013.01); *G06F 9/5016* (2013.01); *G06F 9/52* (2013.01); *G06F 9/526* (2013.01); *G06F 9/4406* (2013.01); *G06F 15/177* (2013.01)

(58) Field of Classification Search
CPC ....... G06F 9/526; G06F 9/4881; G06F 9/5016
USPC .......................................................... 713/2
See application file for complete search history.

(56) References Cited

U.S. PATENT DOCUMENTS

| | | |
|---|---|---|
| 5,442,758 A | 8/1995 | Slingwine et al. |
| 5,608,893 A | 4/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Jaweed A Abbaszadeh
*Assistant Examiner* — Volvick Derose
(74) *Attorney, Agent, or Firm* — Walter W. Duft

(57) ABSTRACT

A technique for shielding real-time workloads from operating system (OS) jitter due to expedited read-copy update (RCU) grace periods. In accordance with the disclosed technique, a kernel parameter is set to indicate that expedited RCU grace periods are to be suppressed. The kernel parameter is checked to see if it is set. A normal non-expedited RCU grace period is invoked in response to attempted invocation of an expedited RCU grace period if the check reveals that the kernel parameter is set.

7 Claims, 5 Drawing Sheets

(56) References Cited

U.S. PATENT DOCUMENTS

| | | | |
|---|---|---|---|
| 6,996,812 | B2 | 2/2006 | McKenney |
| 7,191,272 | B2 | 3/2007 | McKenney |
| 7,287,135 | B2 | 10/2007 | McKenney et al. |
| 7,353,346 | B2 | 4/2008 | McKenney et al. |
| 7,349,879 | B2 | 6/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,141,044 | B2 | 3/2012 | Mann et al. |
| 8,160,845 | B2 | 4/2012 | De et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,271,990 | B2 | 9/2012 | De et al. |
| 8,407,503 | B2 | 3/2013 | McKenney |
| 8,495,641 | B2 | 7/2013 | McKenney |
| 8,605,217 | B1 | 12/2013 | Lafon et al. |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,924,976 | B2 | 12/2014 | Park et al. |
| 8,938,631 | B2 | 1/2015 | McKenney |
| 8,972,801 | B2 | 3/2015 | McKenney |
| 9,003,420 | B2 | 4/2015 | McKenney |
| 9,032,408 | B2 | 5/2015 | Dupont et al. |
| 9,189,413 | B2 | 11/2015 | McKenney |
| 9,229,765 | B2 | 1/2016 | Lee et al. |
| 9,250,978 | B2 | 2/2016 | McKenney |
| 9,256,476 | B2 | 2/2016 | McKenney |
| 9,348,765 | B2 | 5/2016 | McKenney |
| 9,396,226 | B2 | 6/2016 | McKenney |
| 9,389,925 | B2 | 7/2016 | McKenney |
| 2008/0082532 | A1 | 4/2008 | McKenney |
| 2009/0271435 | A1* | 10/2009 | Yako ............... G06F 17/30356 |
| 2010/0023559 | A1* | 1/2010 | McKenney ............... G06F 9/52 707/E17.009 |
| 2010/0023946 | A1* | 1/2010 | McKenney ............ G06F 9/526 718/102 |
| 2010/0115235 | A1* | 5/2010 | Triplett ................... G06F 9/466 712/10 |
| 2012/0210069 | A1* | 8/2012 | Bayer ................... G06F 12/084 711/122 |
| 2013/0061071 | A1 | 3/2013 | McKenney |
| 2014/0281295 | A1* | 9/2014 | McKenney ........... G06F 12/121 711/159 |
| 2014/0380084 | A1 | 12/2014 | McKenney |
| 2015/0153817 | A1* | 6/2015 | McKenney ........... G06F 9/5094 713/323 |

OTHER PUBLICATIONS

P. McKenney et al., "Read-Copy Update," 2001 Ottawa Linux symposium, Jul. 2001, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 FREENIX, Jun. 14, 2003, 13 pages.

P. McKenney et al., "Using RCU in the Linux 2.5 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[Patch] slab: document Slab_Destroy_by_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN.net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN.net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net,Dec. 24, 2007, 15 pages.

P. McKenney, RCU part 3: the RCU API, LWN.net, Jan. 7, 2008, 7 pages.

P. McKenney, "Integrating and Validating dynticks and Preemptible RCU," LWN.net, Apr. 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2008, 19 pages.

P. McKenney, "Using a Malicious User-Level RCU to Torture RCU-Based Algorithms", linux.conf.au, Jan. 2009, 51 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 8, 2010, 11 pages.

J. Triplett et al., "Resizable, Scalable, Concurrent Hash Tables via Relativistic Programming", ACM-SIGOPS Operating System Review vol. 44, Issue 3, Jul. 2010, 14 pages.

M. Desnoyers et al., "User-Level Implementations of Read-Copy Update", IEEE Transactions on Parallel and Distributed Systems, vol. x, No. y, Jul. 2009, pp. 1-14.

P. McKenney, "Making RCU Safe for Battery-Powered Devices", Embedded Linux Conference, Feb. 15, 2012, pp. 1-66.

(56) References Cited

OTHER PUBLICATIONS

P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.Little", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
De et al., "Handling OS Jitter on Multicore Multithreaded Systems", Conference: 23rd IEEE International Symposium on Parallel and Distributed Processing, IPDPS May 2009, 12 pages.
ip.com et al, "Avoiding OS jitter from rcu_barrier( ) for CPU-bound processes", IPCOM000235043D, Feb. 25, 2014, 2 pages.
ip.com et al., "A System and Method for Predicting Scalability of Parallel Applications in Presence of Operating System (OS) Jitter using Trace Driven Simulation", IPCOM000200892D, Oct. 28, 2010, 8 pages.
International Business Machines Corporation, "List of IBM Patents or Patent Applications Treated as Related", Feb. 5, 2017, 2 pages.

\* cited by examiner

SHIELDING REAL-TIME WORKLOADS FROM OS JITTER DUE TO EXPEDITED GRACE PERIODS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer ( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference ( ) primitive.

At some subsequent time following the update, r1 will have continued its traversal of the linked list and moved its reference off of B. In addition, there will be a time at which no other reader task is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. More generally, a quiescent state may be delineated by a kernel code path being outside an RCU read-side critical section. RCU read-side primitives such as rcu_read_lock ( ) and rcu_read_unlock ( ) are commonly used by the readers to denote the beginning and end of such critical sections.

In FIG. 3, four tasks 0, 1, 2, and 3 running on four separate CPUs are shown to pass periodically through quiescent states (represented by the vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

In some RCU implementations, such as current versions of the Linux® kernel, there are expedited and normal RCU grace periods. A normal RCU grace period may be initiated by way of a call to the synchronize_rcu ( ) or synchronize_sched ( ) primitives whereas a call to the synchronize_rcu_expedited ( ) or synchronize_sched_expedited ( ) primitives initiates an expedited RCU grace period. Expedited RCU grace periods can be orders of magnitude faster than normal RCU grace periods and are thus useful for latency-sensitive operations.

Some latency-sensitive portions of the Linux® kernel use expedited RCU grace periods to reduce update latency. For example, networking code uses expedited grace periods when handling some types of configuration updates in order to avoid excessive delays in response to requests to update configuration. By way of further example, some devices enable expedited grace periods unconditionally during bootup in order to speed up the boot process. Unfortunately, there is a penalty for using expedited RCU grace periods, namely OS jitter, which can adversely affect aggressive real-time workloads. As is known, OS jitter refers to latency irregularities in OS operations, meaning that the latency of a given OS operation will vary over time instead of being uniform and predictable. Expedited RCU grace period processing increases OS jitter due to the use of interprocessor interrupts (IPIs) to expedite RCU grace periods. Insofar as expedited RCU grace periods occur asynchronously, so do the IPIs that they invoke. This results in CPUs that may be running real-time workloads experiencing more or less random IPI overhead, and hence increased OS jitter.

It would therefore be desirable to provide a solution to the problem of expedited RCU grace periods inducing OS jitter on event-driven real-time applications.

SUMMARY

A method, system and computer program product are provided for shielding real-time workloads from operating system (OS) jitter due to expedited read-copy update (RCU) grace periods. In accordance with the disclosed technique, a kernel parameter is set to indicate that expedited RCU grace periods are to be suppressed. The kernel parameter is checked to see if it is set. A normal non-expedited RCU grace period is invoked in response to attempted invocation of an expedited RCU grace period if the check reveals that the kernel parameter is set.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1A:
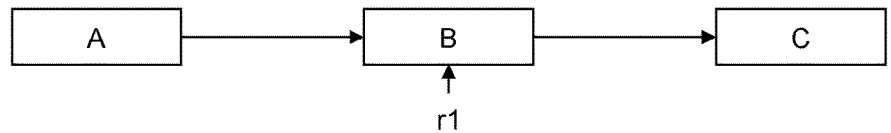
FIGS. 1A-1D are diagrammatic representations of a linked list of data elements undergoing a data element replacement according to a conventional read-copy update mechanism.
Figure 1B:
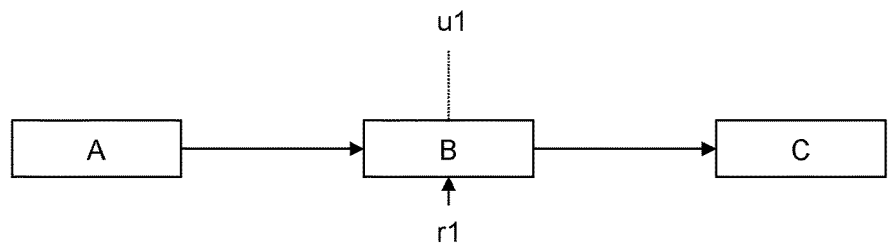
Figure 1C:
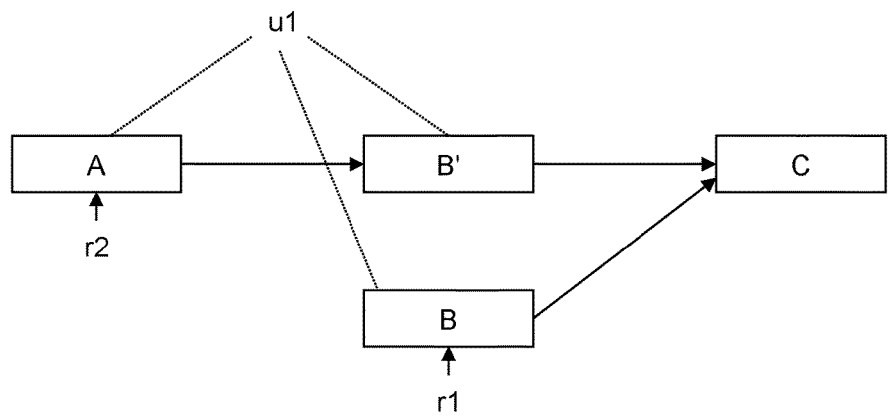
Figure 1D:
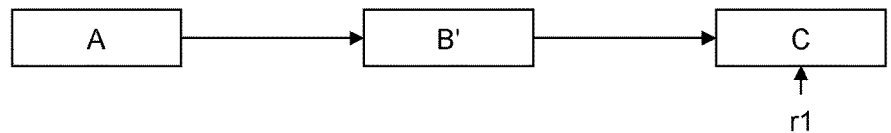
Figure 2A:
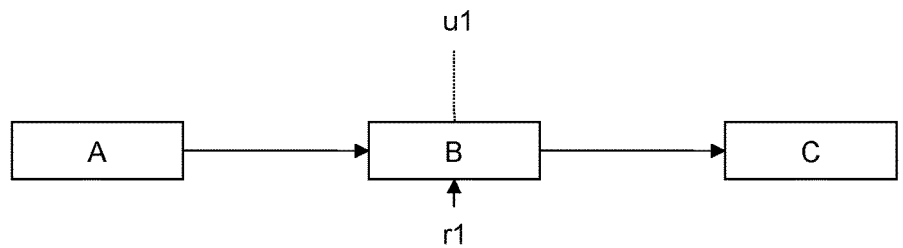
FIGS. 2A-2C are diagrammatic representations of a linked list of data elements undergoing a data element deletion according to a conventional read-copy update mechanism.
Figure 2B:
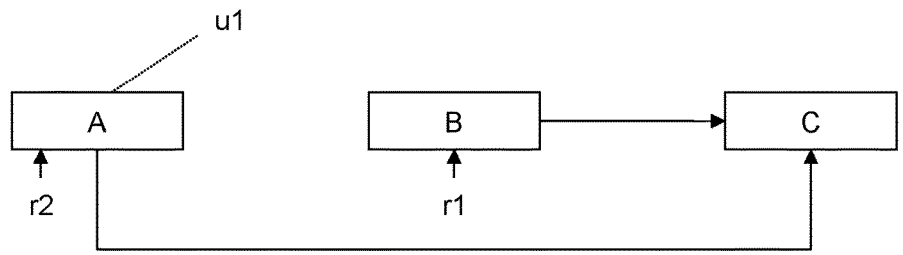
Figure 2C:
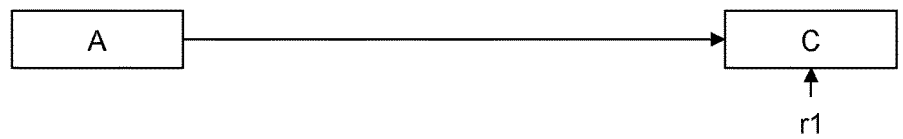
Figure 3:
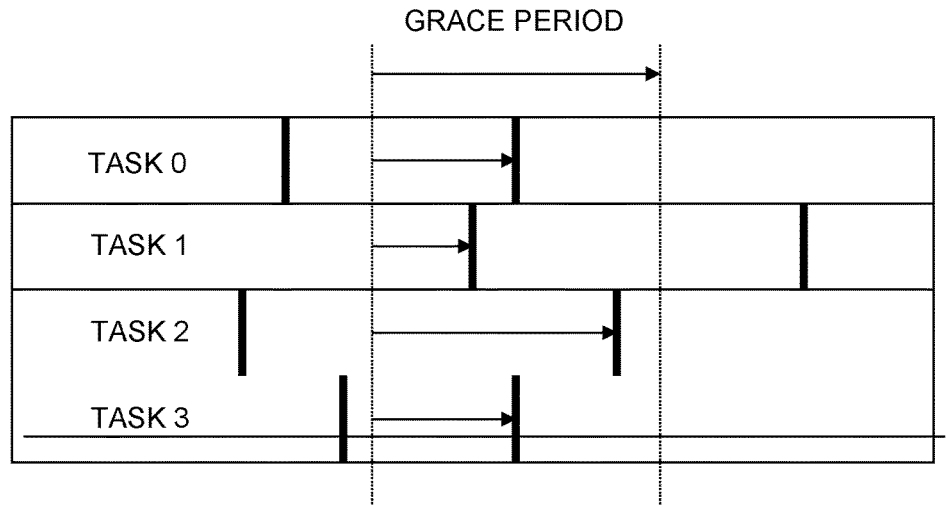
FIG. 3 is a flow diagram illustrating an example prior art grace period in which four processes pass through a quiescent state.
Figure 4:
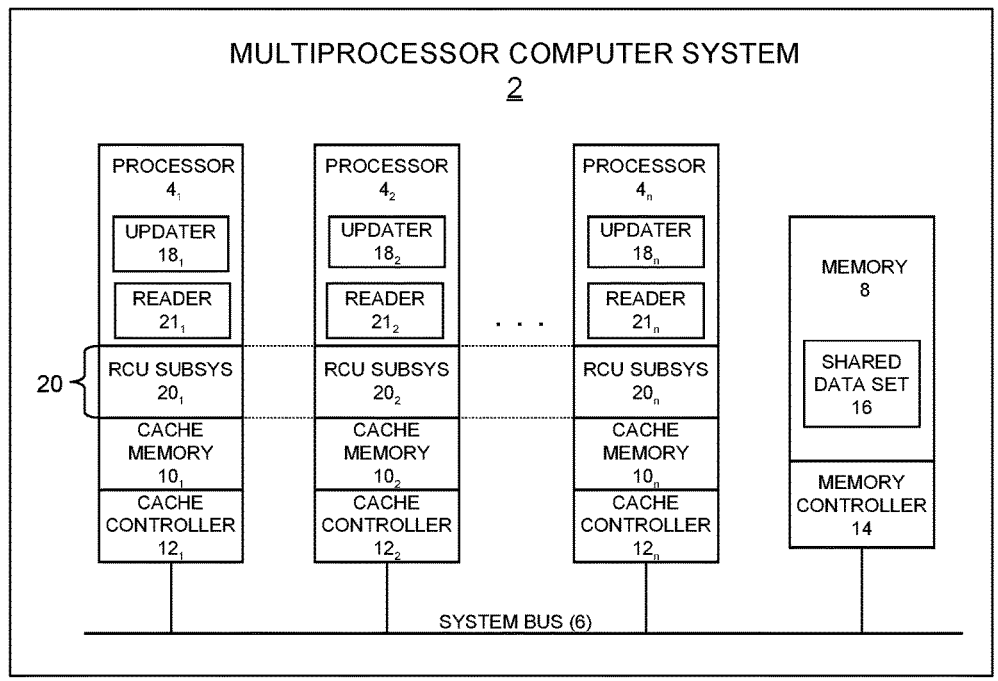
FIG. 4 is a functional block diagram showing a multiprocessor computing system.

Turning now to the figures, wherein like reference numerals represent like elements in all of the several views, FIG. 4 illustrates an example multiprocessor computer system 2 in which a technique for shielding real-time workloads from OS jitter due to expedited RCU grace periods may be implemented. In FIG. 4, a computer system 2 may include a plurality of processors $4_1, 4_2 \ldots 4_n$, a system bus 6, and a program memory 8. There may also be cache memories $10_1, 10_2 \ldots 10_n$ and cache controllers $12_1, 12_2 \ldots 12_n$ respectively associated with the processors $4_1, 4_2 \ldots 4_n$. A memory controller 14 may be associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1$, $10_2 \ldots 10_n$ may be implemented in several levels (e.g., as level 1, level 2 and level 3 caches) and the cache controllers $12_1$, $12_2 \ldots 12_n$ may collectively represent the cache controller logic that supports each cache level. As illustrated, the memory controller 14 may reside separately from processors $4_1$, $4_2 \ldots 4_n$, for example, as part of a discrete chipset. Alternatively, as previously mentioned, the memory controller 14 could be provided by plural memory controller instances that are respectively integrated with the processors $4_1$, $4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 may run from program instructions stored in the memory 8 (or elsewhere) in order to periodically perform updates on a set of shared data 16 that may be stored in the shared memory 8 (or elsewhere). In FIG. 4, reference numerals $18_1$, $18_2 \ldots 18_n$ illustrate individual data updaters that respectively execute on the several processors $4_1$, $4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1$, $20_2 \ldots 20_n$ represent individual RCU instances that may respectively periodically execute on the several processors $4_1$, $4_2 \ldots 4_n$. Operational details of the RCU subsystem 20 are described below.

Any given processor 4 may also periodically execute a read operation (reader) 21. Each reader 21 may run from program instructions stored in the memory 8 (or elsewhere) in order to periodically perform read operations on the set of shared data 16 stored in the shared memory 8 (or elsewhere). In FIG. 4, reference numerals $21_1$, $21_2 \ldots 21_n$ illustrate individual reader instances that may respectively execute on the several processors $4_1$, $4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

In an example embodiment, the readers 21 may be preempted while executing within their RCU read-side critical sections. This would be the case, for example, if the readers 21 embody kernel code paths in a preemptible operating system kernel. To accommodate such reader preemption, the RCU subsystem 20 may be configured as a preemptible RCU implementation.

During operation of the computer system 2, an updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may call an RCU primitive such as synchronize_rcu ( ) or synchronize_sched ( ) to invoke the RCU subsystem 20 to track a normal RCU grace period for deferred destruction of the pre-update view of the data (second-phase update). The normal grace period processing performed by the RCU subsystem 20 may entail starting new grace periods and detecting the end of old grace periods so that the RCU subsystem 20 knows when it is safe to free stale data (or take other actions). Alternatively, an updater 18 may call an RCU primitive such as synchronize_rcu_expedited ( ) or synchronize_sched_expedited ( ) to invoke the RCU subsystem 20 to track an expedited normal RCU grace period.

Figure 5:
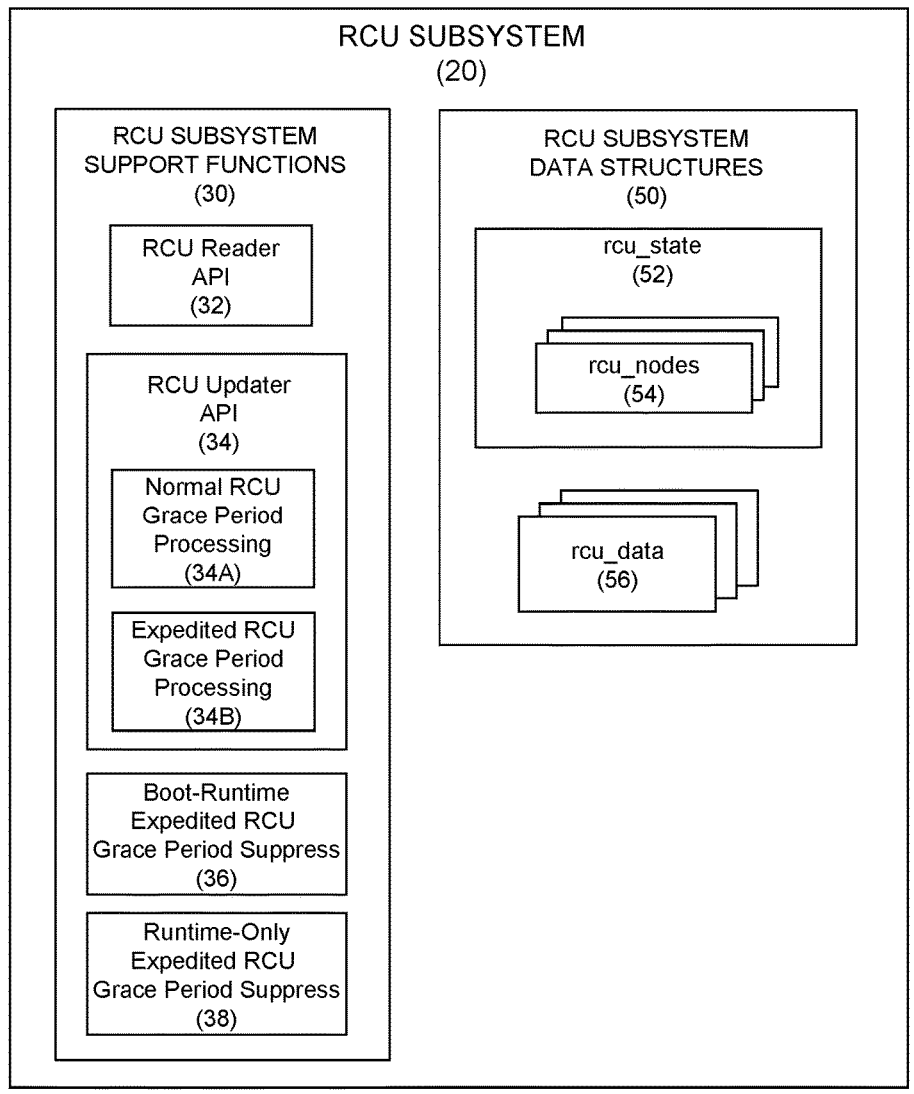
FIG. 5 is a functional block diagram showing an example RCU subsystem that may be provided in the computer system of FIG. 4.

Turning now to FIG. 5, example components of the RCU subsystem 20 are shown. Among these components is a set of RCU subsystem support functions 30, namely, an RCU reader API (Application Programming Interface) 32 and an RCU updater API 34.

The RCU reader API 32 may comprise a reader registration component and a reader unregistration component that are respectively invoked by readers 21 as they enter and leave their RCU read-side critical sections to read shared data 16. This allows the RCU subsystem 20 to track reader operations and determine when readers are engaged in RCU-protected read-side critical section processing. In an example embodiment, the reader registration and unregistration components may be respectively implemented using the rcu_read_lock ( ) and rcu_read_unlock ( ) primitives found in existing read-copy update implementations.

The RCU updater API 34 may comprise a normal RCU grace period processing component 34A and an expedited RCU grace period processing component 34B. The normal RCU grace period component 34A may include synchronization primitives such as synchronize_rcu ( ) or synchronize_sched ( ) for use by updaters 18 to defer the removal of shared data 16 that may be referenced by the readers 21 until a normal RCU grace period has elapsed. These functions, which may be implemented in the context of a kernel thread (e.g. a Linux® kthread), perform normal RCU grace period processing that may include starting new normal RCU grace periods and detecting the end of old normal RCU grace periods by waiting for CPUs in the computer system 2 to pass through quiescent states.

The expedited RCU grace period component 34B may include synchronization primitives such as synchronize_rcu_expedited ( ) or synchronize_sched_expedited ( ) for use by updaters 18 to defer the removal of shared data 16 that may be referenced by the readers 21 until an expedited RCU grace period has elapsed. These functions perform expedited RCU grace processing that may include starting new expedited RCU grace periods and detecting the end of old expedited RCU grace periods by actively initiating quiescent states on the CPUs in the computer system 2. In an example embodiment, this may be done by sending an interprocessor interrupt (IPI) to all non-idle non-nohz (tickless) online CPUs. The IPI handler may check whether the CPU is in an RCU read-side critical section, and if so, it may set a flag that causes the outermost rcu_read_unlock operation (in a set of nested invocations of this read-side RCU primitive) to report the quiescent state. On the other hand, if the CPU is not in an RCU read-side critical section, the IPI handler may report the quiescent state immediately. In a typical RCU implementation, an expedited RCU grace period may be an order of magnitude faster than a normal RCU grace period.

With continuing reference now to FIG. 5, the RCU subsystem 20 may further include a set of RCU subsystem data structures 50. These data structures may include an rcu_state structure 52 having embedded therein (e.g., as a linear array) a combining tree of rcu_node structures 54. The RCU subsystem 20 thus supports hierarchical grace period detection, and may be characterized as a hierarchical RCU implementation. The tree of rcu_node structures tracks information needed to determine when RCU grace periods have elapsed. Such tracked information may include, within each rcu_node structure, a bitmask that identifies CPUs that have passed through a quiescent state and a list of blocked readers 21 that have been preempted within an RCU read-side critical section. Each leaf rcu_node structure 54 may additionally have a set of a per-processor rcu_data structures 56 assigned to it. Each rcu_data structure 56 represents one CPU in the computer system 2 and can be used to maintain rcu-related information specific to that CPU, such as RCU callback lists, quiescent-state and grace-period handling information, and other data.

As discussed in the "Background" section above, expedited RCU grace periods can increase OS jitter, which adversely affects real-time workloads. This is especially true for event-driven real-time workloads (as opposed to CPU-bound polling-loop real-time workloads). A solution to this problem is to provide a kernel parameter that can be set to indicate that expedited RCU grace periods are to be suppressed. The kernel parameter may thereafter be checked, and if it is set, a normal non-expedited RCU grace period may be invoked in response to an attempted invocation of the expedited RCU grace period.

Figure 6:
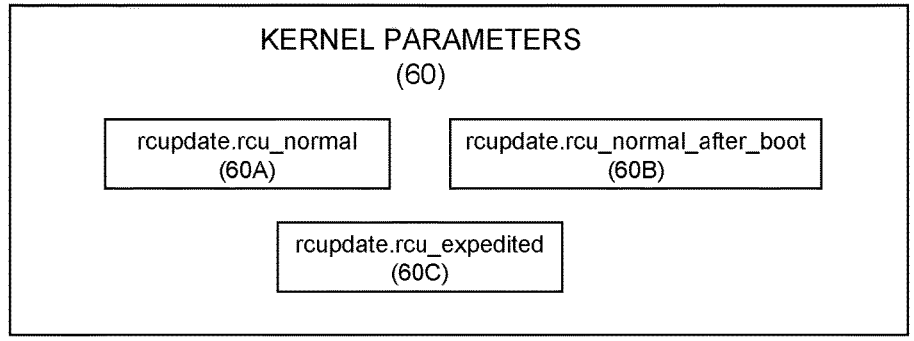
FIG. 6 is a functional block diagram showing example OS Kernel parameters.

An example kernel parameter is shown by the rcupdate.rcu_normal flag 60A in FIG. 6. This kernel parameter, which can be provided as part of a set of kernel parameters 60, may be used to signify that expedited RCU grace periods are to be suppressed both at kernel boot time and during kernel runtime. A second kernel parameter that may also be provided is the rcupdate.rcu_normal_after_boot flag 60B. As described in more detail below, this parameter may be used to signify that expedited RCU grace periods are to be suppressed only after kernel boot time. A third kernel parameter, which is part of existing RCU implementations in current versions of the Linux® kernel, is the rcupdate.rcu_expedited flag 60C. This flag is used to enable the conversion of normal RCU grace periods to expedited RCU grace periods.

In an embodiment, the check of the kernel parameter (e.g., the rcupdate.rcu_normal flag 60A) may be performed in response to the attempted invocation of the expedited RCU grace period.

In an embodiment, the check of the kernel parameter may be implemented within an expedited RCU grace period function, such as the synchronize_rcu_expedited ( ) or synchronize_sched_expedited ( ) functions provided by the expedited RCU grace period processing component 34B of FIG. 5.

In an embodiment, the invoking of a normal RCU grace period may be implemented within the same expedited RCU grace period function. For example, the synchronize_rcu_expedited ( ) or synchronize_sched_expedited ( ) functions could respectively invoke the synchronize_rcu ( ) or synchronize_sched ( ) functions if the kernel parameter is set, and would then operate in the same way. In FIG. 5, the RCU subsystem 20 is shown as including function called Boot-Runtime Expedited RCU Grace Period Suppress 36. This function, which is described below in connection with FIG. 7, may be incorporated into the synchronize_rcu_expedited ( ) or synchronize_sched_expedited ( ) functions to perform the expedited RCU grace period suppress and normal RCU grace period invocation operations.

The kernel parameter may be set either at kernel boot time or at kernel runtime. For example, an aggressive real-time system could set the rcupdate.rcu_normal flag 60A by specifying it as a kernel boot parameter in order to avoid any and all OS jitter that otherwise would have been introduced by expedited RCU grace periods. In other situations, it may be desirable to allow expedited RCU grace periods during a boot sequence so that suppression is deferred during boot time, then activated at run time. The reason is that OS jitter is typically not an issue during boot, but boot speed can be an issue for aggressive real-time systems.

In one example runtime-only scenario, there may be an in-kernel boot sequence followed by a significant non-in-kernel bootup phase after the in-kernel boot sequence completes. In that case, the rcupdate.rcu_normal flag 60A could be set during kernel runtime at the end of the extended bootup phase (e.g., by a sysfs operation) to defer expedited RCU grace period suppression until bootup completes.

Another example runtime-only scenario involves use of the rcupdate.rcu_normal_after_boot flag 60B. The rcupdate.rcu_normal_after_boot flag 60B serves as a second kernel parameter that may be used to suppress expedited RCU grace periods only after the in-kernel portion of the boot process has completed. Specifically, this second kernel parameter may be checked by a function that operates at the end of an in-kernel boot sequence, immediately prior to an init process being spawned. If the function determines that the second kernel parameter is set, signifying that expedited RCU grace periods are to be suppressed only during kernel runtime, the function can set the first kernel parameter (e.g., the rcupdate.rcu_normal flag 60A) so that subsequent expedited RCU grace periods occurring after kernel boot time, will be suppressed. An example of this function is the Runtime-Only Expedited RCU Grace Period Suppress function 38 in FIG. 5. This function is described below in connection with FIG. 8.

As previously noted, the rcupdate.rcu_expedited flag 60C is an existing kernel parameter that enables the conversion of normal RCU grace periods to expedited RCU grace periods. Both the rcupdate.rcu_normal flag 60A and the rcupdate.rcu_normal_after_boot flag 60B may be implemented to override the rcupdate.rcu_expedited flag 60C. In an example scenario, if the rcupdate.rcu_expedited flag 60C is set at kernel boot time and the rcupdate.rcu_normal flag 60B is set at the end of a non-in-kernel bootup phase (e.g., by a sysfs operation), all RCU grace periods will be expedited during bootup and non-expedited thereafter. In another example scenario, the rcupdate.rcu_expedited flag 60C and the rcupdate.rcu_normal_after_boot flag 60B may both be set at kernel boot time. In that case, all RCU grace periods will be expedited during kernel boot and non-expedited after the in-kernel boot sequence completes. Both of the above scenarios combine the advantages of fast boot with OS-jitter-free runtime execution.

Figure 7:
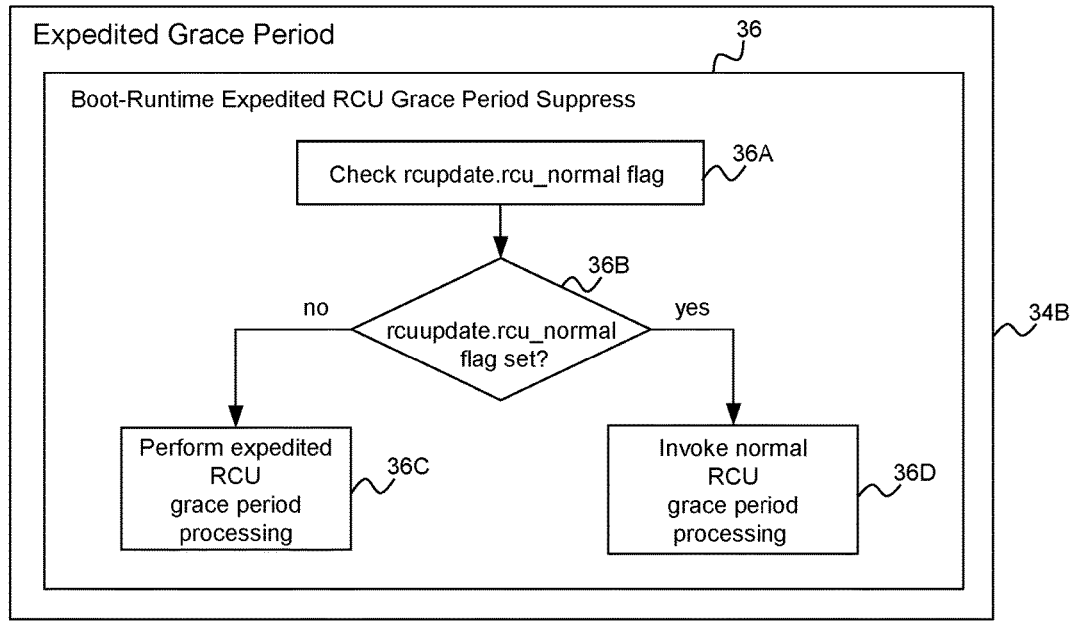
FIG. 7 is a flow diagram illustrating example processing that may be performed by a boot-runtime expedited RCU grace period suppress component.

Turning now to FIG. 7, example operations that may be performed by the boot-runtime expedited RCU grace period processing component 36 will be described. In block 36A, a check is made of the rcupdate.rcu_normal flag 60A. Block 36B branches depending on the kernel parameter state. If the rcupdate.rcu_normal flag 60A is not set, block 36C performs expedited RCU grace period processing. If the rcupdate.rcu_normal flag 60A is set, block 36D suppresses expedited RCU grace period processing and causes normal RCU grace period processing to be invoked. It will be seen in FIG. 7 that the boot-runtime expedited RCU grace period processing component 36 may run within the expedited RCU grace period processing component 34B. If the former component allows only normal RCU grace period processing (i.e., the rcupdate.rcu_normal flag 60A is set), such processing will be performed each time a call is made to the expedited RCU grace period processing component 36. This will effectively suppress expedited RCU grace periods both at kernel boot time and at kernel runtime.

Figure 8:
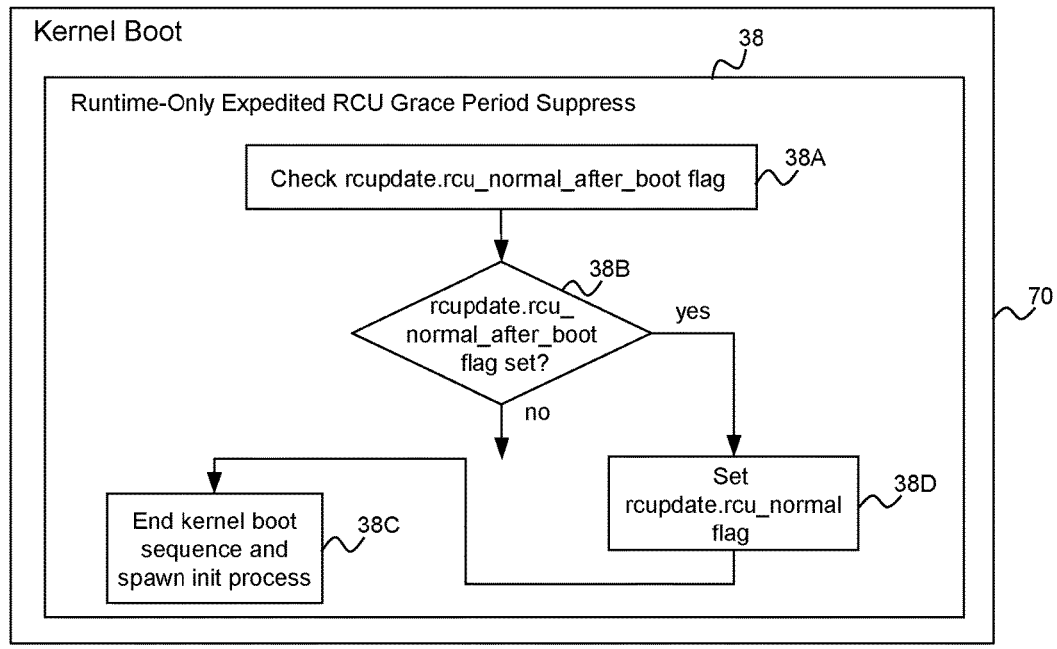
FIG. 8 is a flow diagram illustrating example processing that may be performed by a runtime-only expedited RCU grace period suppress component.

Turning now to FIG. 8, example operations that may be performed by the runtime-only expedited RCU grace period processing component 38 will be described. In block 38A, a check is made of the rcupdate.rcu_normal_after_boot flag 60B. Block 38B branches depending on the kernel parameter state. If the rcupdate.rcu_normal_after_boot flag 60B is not set, block 38C ends kernel boot sequence operations and spawns the init process. If the rcupdate.rcu_normal_after_boot flag 60B is set, block 38D sets the rcupdate.rcu_normal flag 60A before control proceeds to block 38C. The runtime-only expedited RCU grace period processing component 38 may run within a kernel boot component 70 as a final set of operations before the kernel boot sequence ends. Because the rcupdate.rcu_normal flag is not set until block 38D, the entire kernel boot sequence will run with expedited RCU grace periods enabled (provided the rcupdate.rcu_expedited flag 60C was set at the beginning of the kernel boot sequence). Expedited RCU grace period processing will not be suppressed until after the kernel boot sequence has ended. At that point, the rcupdate.rcu_normal flag 60A will be set and normal RCU grace period processing will be performed each time a call is made to the expedited RCU grace period processing component 36.

Accordingly, a technique for short-circuiting normal read-copy update (RCU) grace period computations in the presence of expedited RCU grace periods has been disclosed. Advantageously, the technique permits real-time systems to entirely avoid OS jitter induced by expedited RCU grace periods, especially for event-driven (as opposed to CPU-bound polling-loop) real-time workloads, while still allowing non-real-time workloads to enjoy the throughput and response-time advantages of expedited RCU grace periods. All that is required is to reset one or more kernel parameters to either enable or suppress expedited RCU grace periods.

It will be appreciated that the foregoing concepts may be variously embodied in any of a data processing system, a machine implemented method, and a computer program product in which programming logic is provided by one or more computer readable data storage media for use in controlling a data processing system to perform the required functions. Example embodiments of a machine-implemented method and data processing system were previously described in connection with FIGS. 4-8.

With respect to a computer program product, digitally encoded program instructions may be stored on one or more computer readable data storage media for use in controlling a computer or other information handling machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 9:
FIG. 9 is a diagrammatic illustration showing example computer readable data storage media that may be used to provide a computer program product in accordance with the present disclosure.

Example computer readable data storage media for storing such program instructions are shown by reference numerals 8 (memory) and 10 (cache) of the computer system 2 of FIG. 4. The computer system 2 may further include one or more secondary (or tertiary) storage devices (not shown) that could store the program instructions between system reboots. The computer system 2 could also store information on one or more remote servers (not shown), which would also include a computer readable storage medium for storing program instructions as described herein. A further example of a computer readable data storage medium that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Examples of such media are shown by reference number 100 in FIG. 9.

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). As previously mentioned, in some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

The computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A method for shielding real-time workloads from operating system (OS) jitter due to expedited read-copy update (RCU) grace periods, said method comprising:
    setting a kernel parameter indicating that expedited RCU grace periods are to be suppressed;
    checking said kernel parameter to determine if it is set; and
    invoking a normal non-expedited RCU grace period in response to attempted invocation of an expedited RCU grace period if said checking reveals that said kernel parameter is set.

2. The method of claim 1, wherein said checking said kernel parameter is performed in response to said attempted invocation of said expedited RCU grace period.

3. The method of claim 1, wherein said checking said kernel parameter is implemented within an expedited RCU grace period function.

4. The method of claim 1, wherein said invoking of said normal RCU grace period is implemented within an expedited RCU grace period function.

5. The method of claim 1, wherein said kernel parameter is set either at kernel boot time or at kernel runtime.

6. The method of claim 1, wherein said kernel parameter is set following the end of a non-in-kernel bootup phase.

7. The method of claim 1, wherein said kernel parameter is set at the end of an in-kernel boot sequence prior to an init process being spawned, said kernel parameter being set if a second kernel parameter was set to specify that expedited RCU grace periods are to be suppressed only during kernel runtime.

* * * * *